US012587574B1

(12) United States Patent
Konigsberg et al.

(10) Patent No.: US 12,587,574 B1
(45) Date of Patent: Mar. 24, 2026

(54) TECHNIQUES FOR CROSS ENTITY CORRELATION OF USER ACCOUNTS IN CLOUD COMPUTING ENVIRONMENTS

(71) Applicant: Wiz, Inc., New York, NY (US)

(72) Inventors: Ron Konigsberg, Tel Aviv (IL); Itay Harel, Tel Aviv (IL); Dan Becker, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/224,124

(22) Filed: May 30, 2025

(51) Int. Cl.
*H04L 9/40* (2022.01)
*H04L 67/10* (2022.01)

(52) U.S. Cl.
CPC .......... *H04L 63/20* (2013.01); *H04L 63/1416* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 10,419,463 B2 | 9/2019 | Muddu et al. | |
| 11,074,218 B2 | 7/2021 | Faith et al. | |
| 11,334,833 B2 | 5/2022 | Friske et al. | |
| 2017/0289339 A1* | 10/2017 | Riva ................. | H04M 1/72445 |
| 2020/0287915 A1* | 9/2020 | Neuvirth ............. | H04L 63/1416 |
| 2021/0051153 A1* | 2/2021 | Bogdanich Espina ...................... | |
| | | | H04L 63/105 |
| 2022/0231985 A1 | 7/2022 | Rapaport et al. | |
| 2022/0309156 A1* | 9/2022 | Grossman ............. | G06F 21/554 |
| 2023/0379346 A1* | 11/2023 | Goldstein ............... | H04L 63/20 |
| 2024/0007438 A1* | 1/2024 | May ...................... | H04W 12/08 |
| 2024/0179146 A1* | 5/2024 | Pinski .................. | H04L 63/102 |
| 2024/0220304 A1* | 7/2024 | Boyer ................. | H04L 63/1425 |
| 2024/0380767 A1* | 11/2024 | Davraev ............. | H04L 63/1441 |
| 2025/0030549 A1* | 1/2025 | Lindholm ........... | H04L 63/0807 |

* cited by examiner

*Primary Examiner* — Joseph P Hirl
*Assistant Examiner* — Hassan Saadoun
(74) *Attorney, Agent, or Firm* — M&B IP Analysts, LLC

(57) ABSTRACT

A system and method for performing cross-entity correlation of a service account in a cloud computing environment for applying a cybersecurity control is presented. The method includes detecting a terminal service principal in a cloud computing environment; detecting a hint which connects the terminal service principal to a root service principal; storing a representation of the terminal service principal, and the root service in a security database, wherein the security database includes a representation of the cloud computing environment; and applying a control on representation of the terminal service principal based at least on the root service principal.

20 Claims, 6 Drawing Sheets

START

S210
DETECT A PRINCIPAL IN THE COMPUTING ENVIRONMENT

S220
DETECT AN IDENTITY WHICH IS EXTERNAL TO THE COMPUTING ENVIRONMENT

S230
DETECT A HINT CONNECTING THE PRINCIPAL TO THE IDENTITY

S240
STORE A REPRESENTATION OF THE IDENTITY AND THE PRINCIPAL IN A SECURITY DB

END

TECHNIQUES FOR CROSS ENTITY CORRELATION OF USER ACCOUNTS IN CLOUD COMPUTING ENVIRONMENTS

TECHNICAL FIELD

The present disclosure relates generally to cybersecurity, and specifically to utilizing cross entity correlation of user accounts in applying controls on a cloud computing environment.

BACKGROUND

Cloud computing environment utilize principal entities, such as service accounts and user accounts to initiate actions therein. A single user operating across different cloud computing environments, such as development, staging, and production, often does so with multiple user accounts that are assigned distinct permissions. These environments may exist within the same cloud provider or across different platforms, and users typically adopt this separation to align with the principle of least privilege and maintain operational boundaries. In practice, however, this segmentation introduces significant cybersecurity risk, particularly when the same individual holds credentials across all environments.

From a technical perspective, cloud environments are often isolated using separate virtual networks, identity and access management (IAM) configurations, and distinct sets of infrastructure resources. A user may, for example, have elevated privileges (e.g., IAM administrator, access to modify network configurations or deploy workloads) in a development environment, while maintaining only read-only access in production. Despite these boundaries, the user becomes a single point of convergence between these isolated systems. If the user reuses passwords, tokens, or SSH keys across accounts or environments, a breach in one environment, especially one with weaker controls, like development, can compromise others through credential reuse or privilege escalation.

Moreover, environments often differ in their security posture. Development environments might allow for broader network access, minimal logging, and looser authentication mechanisms to facilitate testing. These relaxed controls can expose endpoints or services that attackers exploit to pivot into higher-value targets, such as staging or production. Attackers who gain access to a less secure account can exploit API permissions, container misconfigurations, or identity federation mechanisms to escalate privileges or exfiltrate data. The proliferation of identities and the complexity of maintaining strict role boundaries across environments also complicate security monitoring, increasing the risk that anomalous behavior will go undetected or be misattributed. Thus, a single user with multiple accounts inadvertently increases the overall attack surface and operational complexity.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include detecting a terminal service principal in a cloud computing environment. The method may also include detecting a hint which connects the terminal service principal to a root service principal. The method may furthermore include storing a representation of the terminal service principal, and the root service in a security database, where the security database includes a representation of the cloud computing environment. The method may in addition include applying a control on representation of the terminal service principal based at least on the root service principal. Other embodiments of this aspect include corresponding computer systems, apparatus, and computer programs recorded on one or more computer storage devices, each configured to perform the actions of the methods.

Implementations may include one or more of the following features. The method where detecting the hint further may include: detecting an event indicating that the root service principal assumed a first role. The method where assuming the first role further may include: generating a second service account, the second service account associated with permissions of the first role; detecting an event associated with the second service account, where the service account is configured to initiate at least an action in the cloud computing environment utilizing the second service account. The method where the second service account is the a terminal service account. The method may include: detecting a plurality of service principals, where a first service principal of the plurality of service principals is a terminal service principal of a second service principal of the plurality of service principals. The method may include: detecting the hint in the a runtime event. The method may include: deploying a runtime sensor on a workload deployed in the cloud computing environment; and receiving from the runtime sensor a runtime event. The method where the terminal service principal is an identity utilized only by a workload. The method may include: detecting the hint in an event of a log of the cloud computing environment. The method may include: detecting the hint in a code object, the code object utilized to deploy a resource in the cloud computing environment. Implementations of the described techniques may include hardware, a method or process, or a computer-tangible medium.

In one general aspect, a non-transitory computer-readable medium may include one or more instructions that, when executed by one or more processing circuitries of a device, cause the device to: detect a terminal service principal in a cloud computing environment; detect a hint which connects the terminal service principal to a root service principal; store a representation of the terminal service principal, and the root service in a security database, where the security database includes a representation of the cloud computing environment; and apply a control on representation of the terminal service principal based at least on the root service principal. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect a terminal service principal in a cloud computing environment. The system may in addition detect a hint which connects the terminal service principal to a root service principal. The system may moreover store a representation of the terminal service principal, and the root service in a security database, where the security database s a representation of the cloud computing environment. The system may also apply a control on representation of the terminal service principal based at least on the root service principal. Other embodiments of this aspect include corresponding computer systems, apparatus, and computer programs recorded on one or more computer storage devices, each configured to perform the actions of the methods.

Implementations may include one or more of the following features. The system where the memory contains further instructions that, when executed by the processing circuitry for detecting the hint, further configure the system to: detect an event indicating that the root service principal assumed a first role. The system where the memory contains further instructions that, when executed by the processing circuitry for assuming the first role, further configure the system to: generate a second service account, the second service account associated with permissions of the first role; and detect an event associated with the second service account, where the service account is configured to initiate at least an action in the cloud computing environment utilizing the second service account. The system where the second service account is the a terminal service account. The system where the memory contains further instructions which when executed by the processing circuitry further configure the system to: deploy a runtime sensor on a workload deployed in the cloud computing environment; and receive from the runtime sensor a runtime event. The system where the memory contains further instructions which when executed by the processing circuitry further configure the system to: detect the hint in the runtime event. The system where the terminal service principal is an identity utilized only by a workload. The system where the memory contains further instructions which when executed by the processing circuitry, further configure the system to: detect the hint in an event of a log of the cloud computing environment. The system where the memory contains further instructions which when executed by the processing circuitry further configure the system to: detect the hint in a code object, the code object utilized to deploy a resource in the cloud computing environment. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
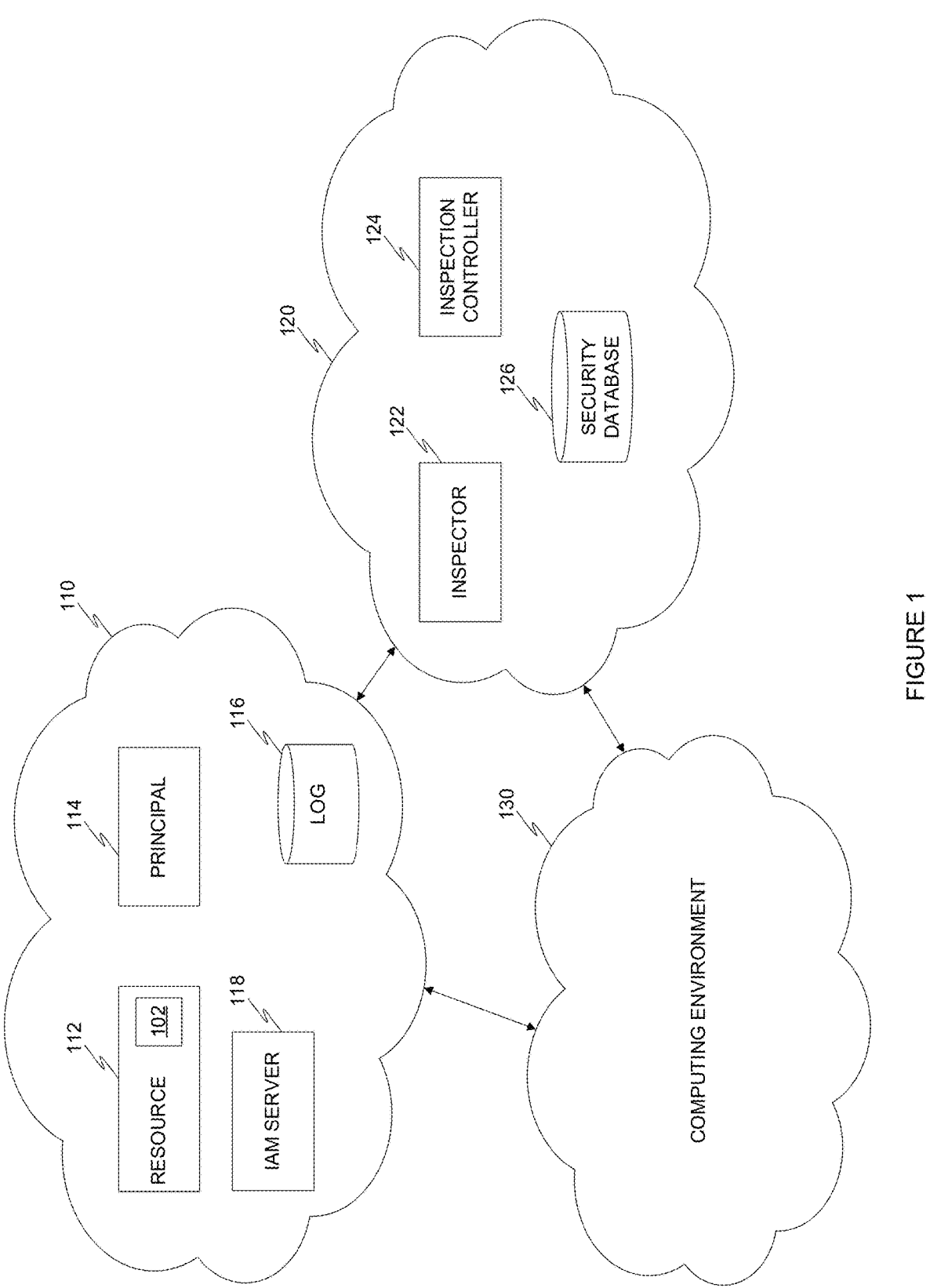
FIG. 1 is an example schematic illustration of multiple cloud computing environment having an inspection environment configured to monitor for cybersecurity issues, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Cloud entities, such as principals, user accounts, roles, service accounts, etc., are entities which are authorized to initiated actions in a cloud computing environment, multiple cloud computing environments, in cloud computing infrastructures, and the like. In some embodiments, cross correlation of cloud entities allows to associate a single cloud entity with multiple actions. Thus, an entity which uses multiple cloud entities, for example by assuming a role, is trackable, and controls, such as policies, can be placed on such an entity, no matter which role, principal, etc., they happen to utilizing currently.

FIG. 1 is an example schematic illustration of multiple cloud computing environment having an inspection environment configured to monitor for cybersecurity issues, implemented in accordance with an embodiment.

A computing environment 110 include a plurality of entities. In an embodiment, an entity is a principal, a resource, and the like. In some embodiments, a computing environment 110 is a cloud computing environment, an on-prem environment, a networked environment, a hybrid environment, a combination thereof, and the like. In some embodiments, a cloud computing environment is implemented on a cloud computing infrastructure, such as Amazon® Web Services (AWS), Google® Cloud Platform (GCP), Microsoft® Azure, a combination thereof, and the like.

In an embodiment, the computing environment 110 includes a virtual private network (VPN), a virtual private cloud (VPC), a virtual network (VNet), a combination thereof, and the like.

In an embodiment, the plurality of entities includes a resource 112 and a principal 114. In an embodiment, a principal 114 is an entity, such as a cloud entity, which is authorized to initiated actions in the computing environment 110. According to an embodiment, a principal 114 is a user account, a service account, a role, a combination thereof, and the like.

In some embodiments, a resource 112 is a physical resource (such as a processing circuitry, a storage device, a memory, etc.), a virtual resource, a combination thereof, and the like. For example, in some embodiments, the resource is a virtual machine, a software container, a serverless function, a combination thereof, and the like.

According to an embodiment, the resource 112 is a nested resource. In some embodiments, the resource 112 includes another resource (e.g., a software container platform deployed on a virtual machine). In certain embodiment, the resource 112 includes an application, such as a web server, a proxy server, a gateway, a load balancer, a combination thereof, and the like.

In an embodiment, a sensor 102 is deployed on the resource 112. In some embodiments, the sensor 102 is configured to detect runtime data from the resource. For example, in some embodiments, the sensor 102 is configured to detect runtime events. In an embodiment, a runtime event includes an identifier of a process, an identifier of an application, an event type, an identifier of a principal, a combination thereof, and the like.

In certain embodiments, the sensor 102 is configured to aggregate runtime events into aggregated runtime data and send the aggregated runtime data to a sensor backend server (not shown). In an embodiment, the sensor backend server is deployed in an inspection environment 120.

In an embodiment, the computing environment 110 includes, or is otherwise communicatively coupled with, an identity and access management (IAM) server 118. In an embodiment, an IAM server is configured to provide access control by defining identities (users, roles, groups) and their permissions using policies. The IAM server 118 is configured, in an embodiment, to authenticate identities and authorize actions on resources based on these policies. In an embodiment, the IAM server 118 is configured to integrate with services via APIs. In some embodiments, the IAM server 118 is configured to provide temporary credentials, and enforce least-privilege principles.

Figure 2:
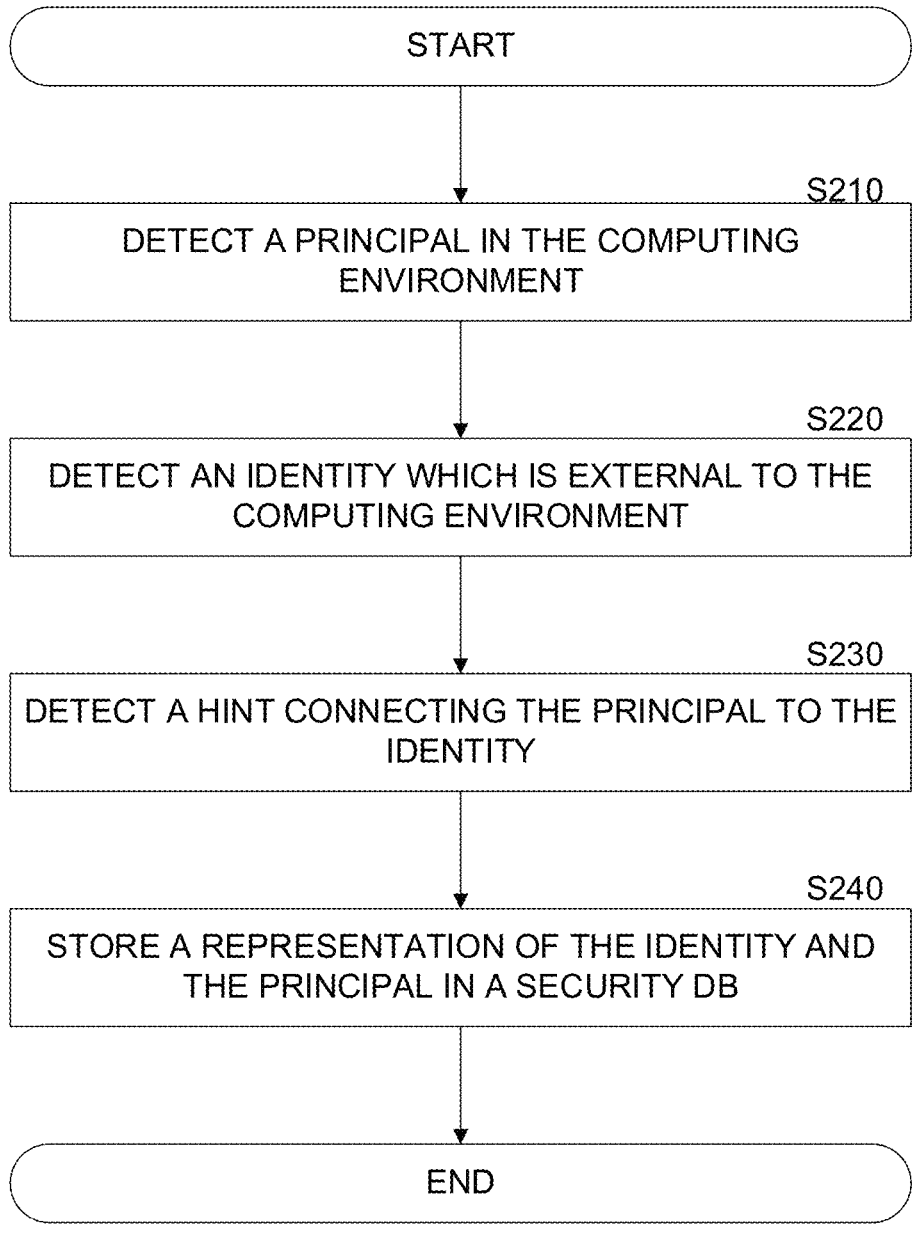
FIG. 2 is an example flowchart of a method for cross entity correlation in a cloud computing environment, implemented in accordance with an embodiment.

In some embodiments, the computing environment 110 includes a log 116. In an event, the log is stored in a storage, such as a bucket on a FIG. 2 is an example flowchart of a method for cross entity correlation in a cloud computing environment, implemented in accordance with an embodiment.

At S210, a principal is detected in a computing environment. In an embodiment, a principal is detected in an identity and access management system, an exchange service, a cloud log, a network log, a runtime execution data log, a combination thereof, and the like.

In an embodiment, detecting a principal includes detecting an identifier, a locally unique identifier, a globally unique identifier, a combination thereof, and the like. In an embodiment, an identifier is, for example, a user account, a user name, an email address, and the like. In an embodiment, a principal corresponds to an entity, such as a cloud entity, which is authorized to initiated actions in a computing environment, such as a cloud computing environment.

At S220, an identity which is external to the computing environment is detected. In an embodiment, the external entity is a primary identity. For example, a primary identity is an email address associated with a domain of an organization. As another example, alice@example.com is an identity which is external to the computing environment, as it represents the primary identity for a user 'alice'. The user 'alice' may be associated with additional principals, such as a Github® account, a Jira® account, and the like.

In some embodiments, detecting the identity includes determining which identity, principal, etc., should be detected as the identity. For example, where two emails are detected alice@example.com and alice@example.co.il, one email (i.e., principal) is a subordinate of the other, such as a country-specific domain, a sub-domain, and the like. In various embodiments, the identity is detected based on predetermined selection rules, for example, selecting the domain ending in '.com' or '.org' as the primary identity. In some embodiments, an external identity is provided by a provider external, for example, to the cloud computing environment 110. An external identity provider is, for example Okta®, an email provider, and the like. In some embodiment, an internal identity is an identity, principal, etc., provided by the organization managing the cloud computing environment.

At S230, a hint is detected. In an embodiment, the hint connects the principal to the identity. In some embodiments, the hint is a data record in a log, such as the cloud log, a network log, a runtime execution data log, a combination thereof, and the like.

In some embodiments, a hint is detected by querying an IAM service to detect a connection between a first principal and an identity. In certain embodiments, a connection is detected between a first principal and a second principal, a plurality of second principals, and the like.

In an embodiment, the hint associates an identity from a first environment with an identity from a second environment. According to some embodiments, detecting entities across environments allows applying controls to entities based on a single identity, rather than applying a control individually to each identity. In other words, a control is applied to all principals associated with an identity, rather than applying a control (e.g., a policy, a rule, and the like) to each individual principal separately.

At S240, a representation is stored. In an embodiment, a representation of each of the identity and the principal is stored in a security database. In an embodiment the security database is configured to store a representation of the cloud computing environment.

According to an embodiment, storing a representation includes generating a representation in a security database. For example, in some embodiments, generating a representation includes generating a node representing an entity in a security graph, implemented on a graph database, such as Node4j®.

In an embodiment, storing the representations in a security database allows applying a control on an identity, across multiple computing environments, across multiple computing infrastructures, a combination thereof, and the like. This is computationally advantageous, as it allows applying the control on a single identity, rather than applying multiple duplicated controls, each on a corresponding entity.

Furthermore, in some embodiments, detecting cross-entity correlation allows detecting cybersecurity risks, for example by detecting events which are all linked to a single identity. For example, a single identity performing (using various principals) actions in a computing environment is not indicative of a cybersecurity threat when viewing each action of each principal individually, however linking the actions (e.g., indicated by events in a log) together based on a cross-correlation of entities allows to detect an access pattern which is not otherwise available, thus increasing detection capabilities in a cybersecurity context.

Figure 3:
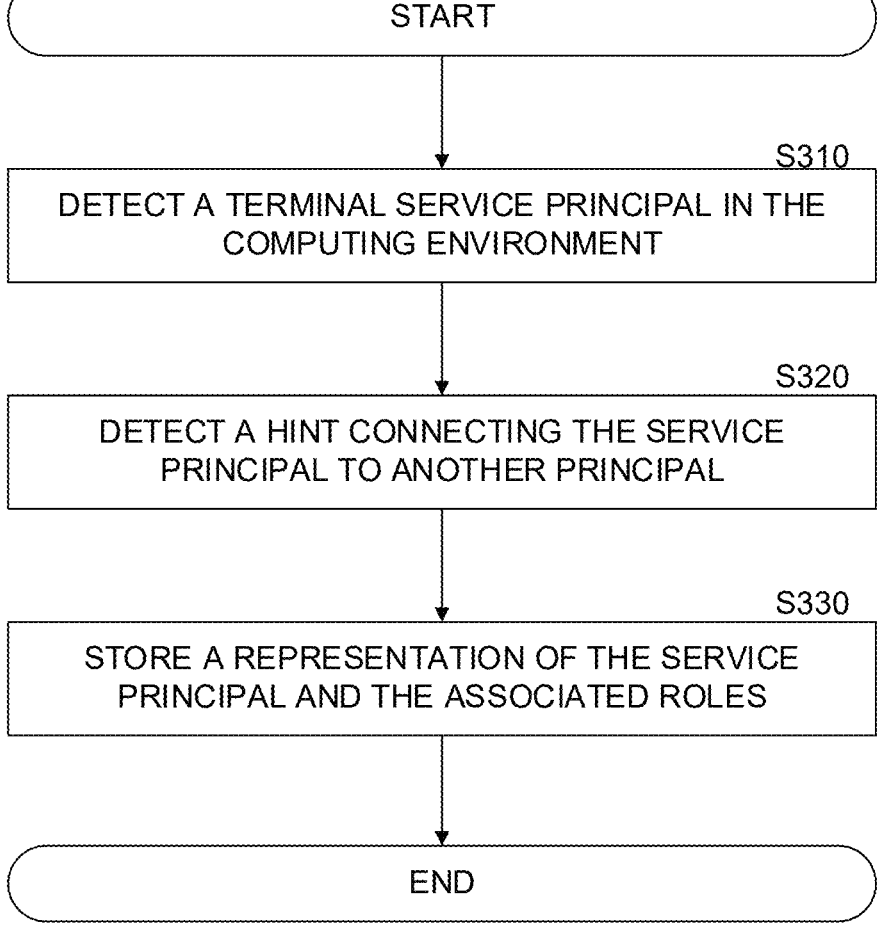
FIG. 3 is a flowchart of a method for cross-correlation of service accounts in a cloud computing environment, implemented in accordance with an embodiment.

FIG. 3 is a flowchart of a method for cross-correlation of service accounts in a cloud computing environment, implemented in accordance with an embodiment.

According to an embodiment, a service account and a user account are both types of principals used to access systems and resources in a computing environment, such as a cloud computing environment, each serving a different purpose, and exhibiting different behavior.

For example, a user account is utilized by a real human. In an embodiment, a user account is tied to a specific individual, and further requires interactive sign-in, e.g., providing a username and a password, utilizing multi-factor authentication (MFA), and the like. User accounts may be utilized to access resources manually, such as accessing email accounts, logging into secure shells (SSH), editing documents, and the like. In an embodiment, a user account is subject to policies such as password expiration, login time restrictions, user-specific permissions based on roles, etc.

In certain embodiments, a service account is utilized by automated processes, applications, etc. A service account, a service principal, and the like accounts, are utilized according to an embodiment, by a software application to perform actions programmatically. Examples of such actions includes a backup script accessing storage, a cloud-based software application (e.g., executed as a serverless function) retrieving data from an API. Unlike user accounts, service accounts may be designed to authenticate without human interaction, using credentials such as cryptographic keys, tokens, a combination thereof, and the like. In some embodiments, a service account has limited permissions tailored to a specific task, and are not subject to user-focused security policies (e.g., password resets).

At S310, a terminal service principal is detected in a computing environment. In an embodiment, the terminal service principal is a service account utilized by another account. For example, in an embodiment, a service account is configured to assume a role in a computing environment. According to an embodiment, assuming a role by a service account generates another service account, which the service account then assumes and acts as the another service account.

As an example, service account "service1" is configured to assume the role of "controller". In response to receiving a request from the service account "service1" to assume the role of "controller", a temporary service account, "service2" is generated. The original service account, "service1" is now authorized to initiate actions as "service2" in the computing environment. Thus, for example, actions initiated in effect by "service1" but in practice by "service2" will show in an event log as being initiated by "service2".

In this example, the temporary service account "service2" is a terminal service account, as it initiates actions, while the original service account "service1" is a root service account.

At S320, a hint is detected connecting the service principal to another service principal. In some embodiments, a plurality of hints are detected, each connecting a first service account to a second service account. In the example above, if the second service account assumes another role, a temporary third service account "service3" is generated, and now actions initiated by "service2" which are in reality initiated by "service1" appear in log records as being initiated by "service3".

In some embodiments, a chain of service accounts is detected through a plurality of hints. In an embodiment, a hint is a data record, such as a record from an event log, a cloud log, a network log, a runtime execution data log, a runtime event, a combination thereof, and the like.

In an embodiment, runtime execution data is received from a sensor application deployed on a resource, the resource deployed in a cloud computing environment. In certain embodiments, runtime data is received and aggregated into a log from a plurality of resources deployed across multiple environments of the same cloud infrastructure, of different cloud infrastructures, etc.

At S330, a representation of the service principal is generated. In an embodiment, generating a representation of a service principal includes generating a representation in a security database, wherein the security database includes a representation of the cloud computing environment.

In some embodiments, a representation of a first service principal (e.g., a terminal service principal) is connected (e.g., via an edge) to a representation of a second service principal (e.g., a root service principal). In certain embodiments, a plurality of service principals are 'chained', such that a representation of a first service principal is connected to a representation of a second service principal, which is connected to a representation of a third service principal, etc., wherein each connection further indicates a relationship (e.g., assume role) between one service principal and another.

According to an embodiment, a control, a policy, and the like, are implemented on a representation of a terminal service principal, on a root service principal, etc., and propagated to every service principal connected thereto. This allows applying a single policy to a service principal, and have the policy, control, etc., propagated onto each and every service principal which is connected.

In certain embodiments, a security database is traversed to determine effective permissions of a root service principal. This allows to detect for example permission escalation, which can occur due to a root service principal assuming multiple roles in a chained fashion as described in the example above. Such permission escalations can pose a cybersecurity risk.

In an embodiment, for example where such effective permissions are detected and determined to be excessive, a mitigation action is initiated. For example, a mitigation action includes revoking permissions from a service account, revoking role assumption privileges from a service account, a combination thereof, and the like.

Figure 4:
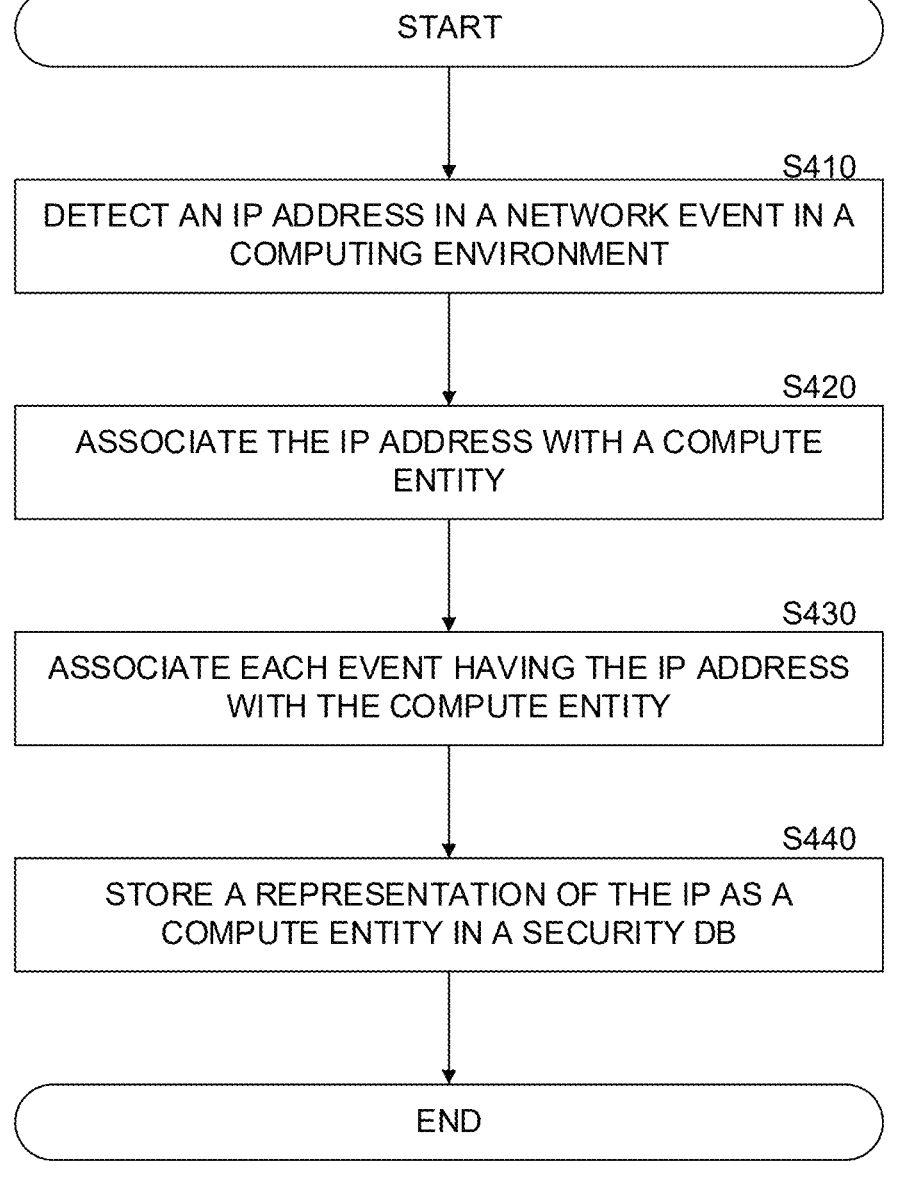
FIG. 4 is an example flowchart of a method for associating compute entities with ephemeral resources.

FIG. 4 is an example flowchart of a method for associating compute entities with ephemeral resources. In an embodiment, certain resources, such as IP addresses can be ephemeral, meaning that they are prone to change. For example, an IP address may be static, or it may be dynamic. A static IP address is non-ephemeral, while a dynamic IP address may be ephemeral, for example depending on how often the address changes.

Detecting such resources, such as a dynamic IP address, and associating it with non-ephemeral resources such as a network interface, allows to associate actions in a computing environment with a static resource. In turn, this allows applying detections, policies, controls, and the like, on the static resources.

At S410, an IP address is detected. In an embodiment, the IP address is detected in a network event recorded in a computing environment, such as a cloud computing environment. In some embodiments, a plurality of network events are recorded, each from a corresponding computing environment, from a plurality of computing environments, etc., where the computing environments are further deployed on a single infrastructure, on a plurality of infrastructures, etc.

In some embodiments, the IP address is a static IP address, a dynamic IP address, etc. In certain embodiments, the network event includes an identifier of a network interface, wherein the network interface is associated with a resource, such as a software container platform.

At S420, the IP address is associated with a cloud entity. In an embodiment, the cloud entity is a compute entity, such as a network interface, a virtual machine, a software container, a serverless function, a combination thereof, and the like.

In an embodiment, associating the IP address with the cloud entity is performed based on an identifier detected in a network log. In some embodiments, the IP address is associated with an identifier of a network interface, and the identifier of the network interface is associated with an identifier of a virtualization, such as listed above.

In an embodiment, a plurality of IP addresses are associated with a cloud entity, for example based on activity records in a log of the cloud computing environment. In certain embodiments, an IP address associated with a cloud entity is periodically evicted, for example after detecting that a last event associating the IP address with the cloud entity (e.g., with a network interface of the cloud entity) occurred prior to a predefined amount of time having lapsed.

At S430, events are associated with the cloud entity. In an embodiment, events associated with the IP address are associated with the cloud entity. In some embodiments, associating an event with a cloud entity includes generating a log including a plurality of events, each event associated with the IP address further being stored with the identifier of the cloud entity. In some embodiments, events of a first time period are associated with a first cloud entity, while events of a second time period are associated with a second cloud entity, for example where a dynamic IP address is determined to have been reassigned, i.e., where an event indicates that the IP address is associated at a first time with a first network interface, and at a second time with a second network interface.

At S440, a representation is stored in a security database. In an embodiment, the security database includes a representation of the cloud computing environment. In some embodiments, the representation is a representation of the cloud entity, and the representation of the cloud entity is further associated (e.g., connected) with a representation of an IP address, with a representation of a network interface, a combination thereof, and the like.

In an embodiment, a control, a policy, a detection, and the like, are applied utilizing the security database. For example, in an embodiment, applying a control on a cloud entity includes applying the control on each event associated with the cloud entity, wherein the cloud entity is associated with events based on the association of the cloud entity with the dynamic IP address.

In some embodiments, applying a detection on a cloud computing environment includes applying a detection to events which are all related to a single cloud entity, and such entity is detected based on events associated with a dynamic IP address. This allows to increase accuracy in detections, reduce false positive detections, and generally address cybersecurity issues faster, thereby reducing the exposure of a cloud computing environment to an attacker.

Figure 5:
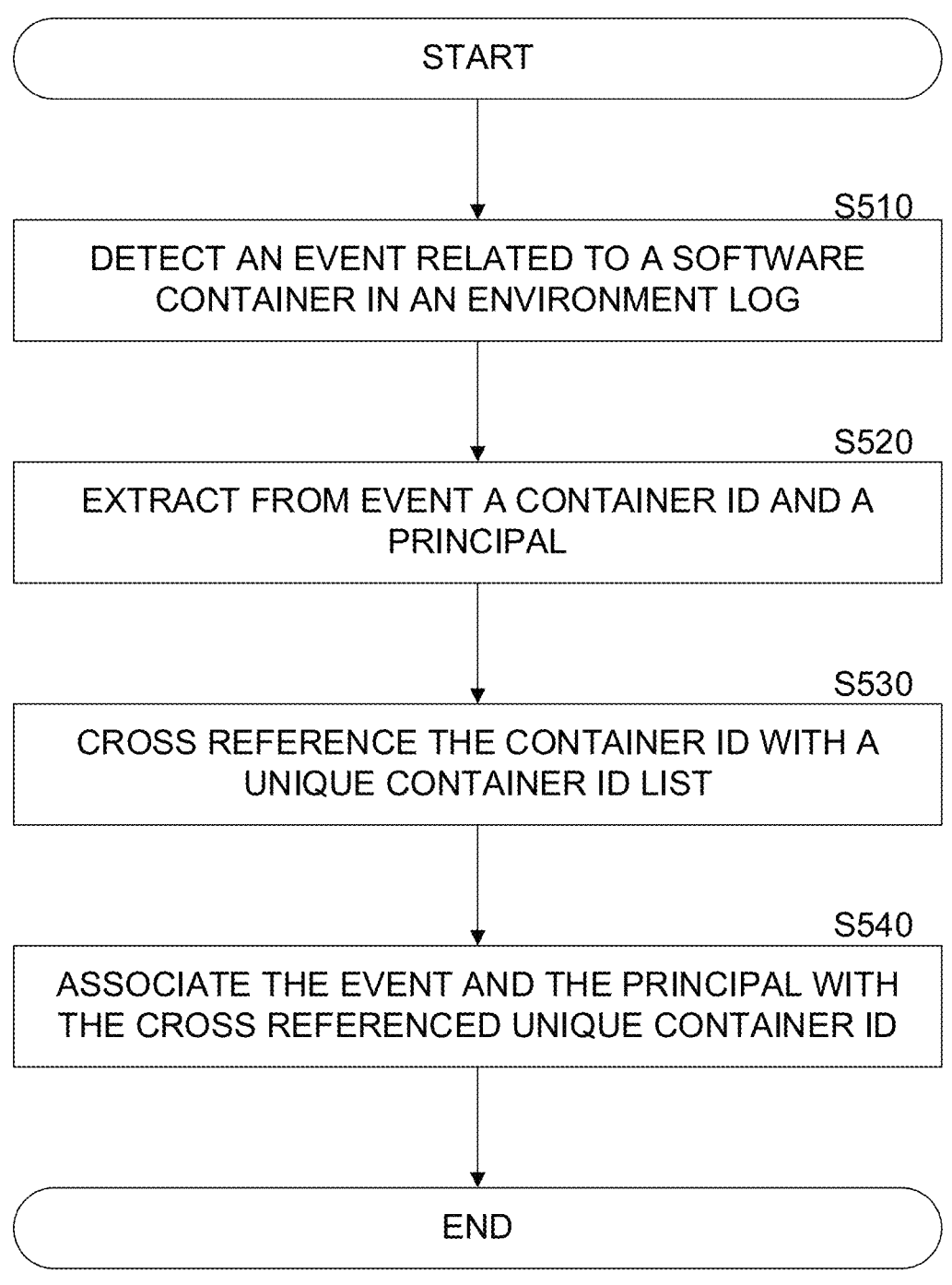
FIG. 5 is an example flowchart of a method for cross-entity correlation of software containers to a software container platform, implemented in accordance with an embodiment.

FIG. 5 is an example flowchart of a method for cross-entity correlation of software containers to a software container platform, implemented in accordance with an embodiment.

At S510, an event related to a software container is detected. In an embodiment, the event is detected in an environment log, for example of a software container platform, of a cloud computing environment, and the like.

In an embodiment, the event includes an identifier of a software container, an action related to the identifier of the software container, and the like. According to an embodiment, a software container is an isolated user-space instance that encapsulates an application and its runtime dependencies, leveraging OS-level virtualization via a shared kernel (such as Linux®). Containers ensure consistent execution environments by abstracting file system, networking, and process space. According to an embodiment, a container is instantiated from immutable images and managed using container runtimes like containerd®, Docker®, and the like. In Kubernetes®, for example, containers are deployed inside a pod. For example, to a containerized NGINX® web server may be configured to deploy in a pod. A Kubernetes platform is configured to schedule and manage this pod across nodes in the cluster.

At S520, a container identifier and a principal are extracted from the event. In an embodiment, a container identifier is a local identifier, i.e., it is not a globally unique identifier which can be used to track events to a certain pod, for example, with certainty.

In an embodiment, it is advantageous to correlate a pod with a specific action in the computing environment, for example for the purposes of detection of cybersecurity issues, for applying controls, for applying policies, a combination thereof, and the like. Typically, pods in a software container cluster share IP addresses, and may share a network interface, making such tracing a difficult task. In some embodiments, data from an admission controller of a software container cluster, runtime data from a sensor, log events, and the like, are all utilized to detect events and associated specific events with a specific pod, specific node, specific container cluster, etc.

In an embodiment, the principal is a service principal utilized by the pod, by the node, etc. In some embodiments, multiple pods are configured to each utilize the same service principal.

At S530, the container identifier is cross-referenced. In an embodiment, the container identifier is cross-referenced with a list of unique container identifiers. In some embodiments, a cloud computing environment, a container platform, and the like, include a list of unique container identifiers, such that each container, pod, node, etc., deployed in the environment includes an identifier which is unique, as opposed, for example, to an identifier of a service principal utilized by multiple nodes, which is therefore not unique to any one node.

In certain platforms, such as Kubernetes, global unique identifiers (GUIDs) are utilized to identity pods, volumes, secrets, and the like. In some embodiments, when a software container is instantiated, the container is assigned a container ID which uniquely identifies the container on the host system, but not universally in the cloud computing environment. Therefore, in order to connect events to a software container, the container ID needs to be cross-referenced with a unique identifier, such as assigned by a Kubernetes platform, an AWS infrastructure, a GCP infrastructure, etc.

At S540, an event is associated with a unique container ID. In an embodiment, the event includes an identifier of a software container (e.g., a container ID), an identifier of a principal (e.g., a service account), a combination thereof, and the like. In some embodiments, where the container ID, the identifier of the principal, a combination thereof, etc., are associated with a unique container ID (or, in an embodiment, another form of a GUID), the event is associated with the unique ID.

According to an embodiment, associating an event with a unique container ID allows to apply a detection, a policy, a control, a rule, and the like, to a unique container. This allows to detect cybersecurity issues in a faster, more reliable manner, for example by reducing false positives. As an example, a software container cluster includes a plurality of nodes which may perform different actions on a shared host. Without associating an individual pod with an action in the manner prescribed herein, it is impossible to determine whether a pod is performing a series of actions which together are a cybersecurity risk, or whether multiple pods are each performing individual actions which are unrelated and therefore do not pose a cybersecurity risk.

Figure 6:
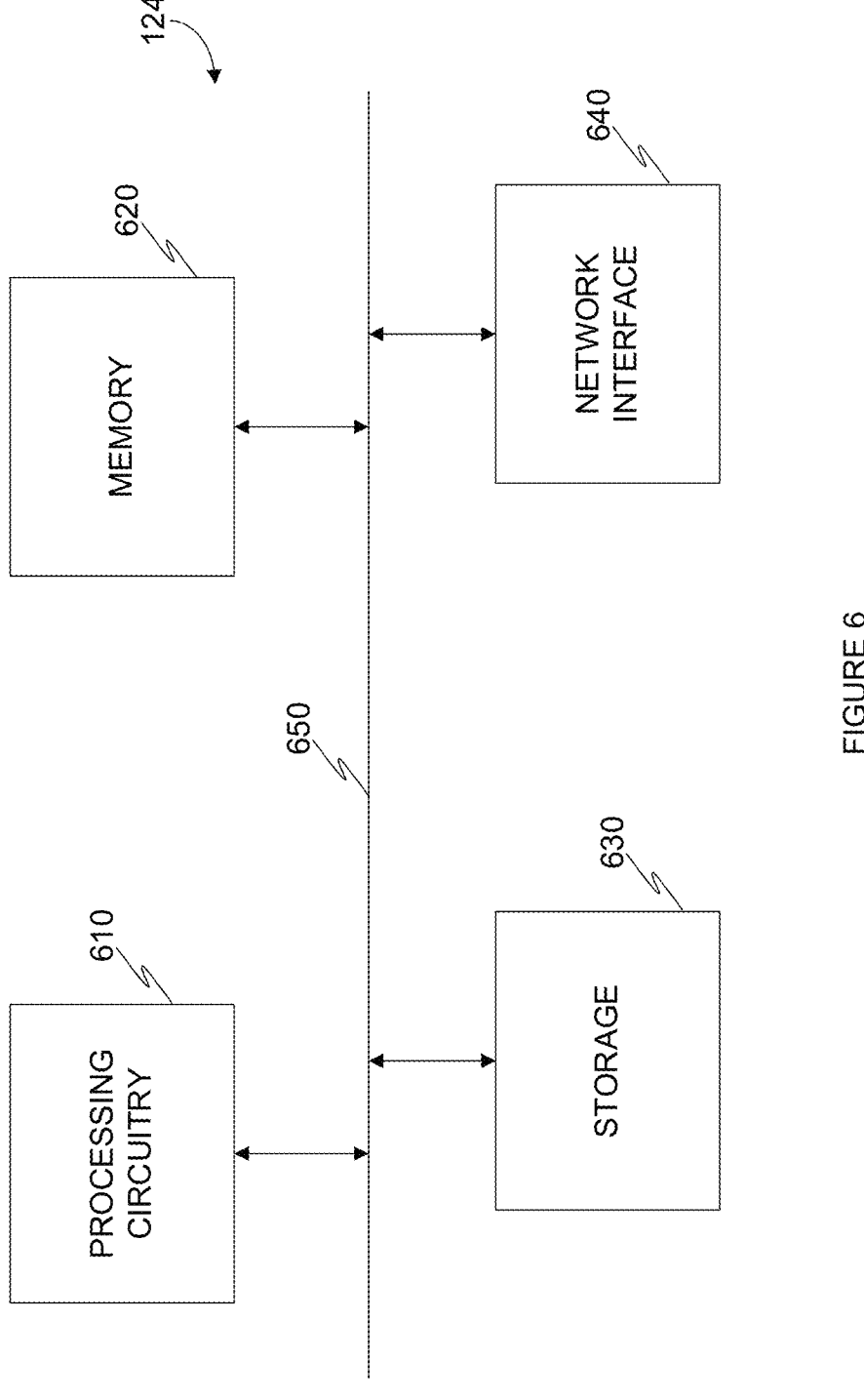
FIG. 6 is an example schematic diagram of a inspection controller according to an embodiment.

FIG. 6 is an example schematic diagram of a inspection controller 124 according to an embodiment. The inspection controller 124 includes, according to an embodiment, a processing circuitry 610 coupled to a memory 620, a storage 630, and a network interface 640. In an embodiment, the components of the inspection controller 124 are communicatively connected via a bus 650.

In certain embodiments, the processing circuitry 610 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 620 is a volatile memory (e.g., random access memory, etc.), a non-volatile memory (e.g., read only memory, flash memory, etc.), a combination thereof, and the like. In some embodiments, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein is stored in the storage 630, in the memory 620, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 610, cause the processing circuitry 610 to perform the various processes described herein, in accordance with an embodiment.

In some embodiments, the storage 630 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 640 is configured to provide the inspection controller 124 with communication with, for example, the network 130, according to an embodiment.

It should be understood that the embodiments described herein are not limited to the specific architecture illustrated in FIG. 6, and other architectures may be equally used without departing from the scope of the disclosed embodiments.

Furthermore, in certain embodiments the inspector 122, the security database 126, and the like, may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

13

14

What is claimed is:

1. A method performing cross-entity correlation of a service account in a cloud computing environment for applying a cybersecurity control, comprising:

detecting a terminal service principal in the cloud computing environment;

detecting a hint which connects the terminal service principal to a root service principal;

storing a representation of the terminal service principal, and the root service principal in a security database, wherein the security database includes a representation of the cloud computing environment; and applying a control on the representation of the terminal service principal based at least on the root service principal.

2. The method of claim 1, wherein detecting the hint further comprises:

detecting an event indicating that the root service principal assumed a first role.

3. The method of claim 2, wherein assuming the first role further comprises:

generating a second service account, the second service account associated with permissions of the first role;

detecting an event associated with the second service account, wherein the service account is configured to initiate at least an action in the cloud computing environment utilizing the second service account.

4. The method of claim 3, wherein the second service account is the terminal service principal.

5. The method of claim 1, further comprising:

detecting a plurality of service principals, wherein a first service principal of the plurality of service principals is a terminal service principal of a second service principal of the plurality of service principals.

6. The method of claim 1, further comprising:

deploying a runtime sensor on a workload deployed in the cloud computing environment; and receiving from the runtime sensor a runtime event.

7. The method of claim 6, further comprising:

detecting the hint in the runtime event.

8. The method of claim 1, wherein the terminal service principal is an identity utilized only by a workload.

9. The method of claim 1, further comprising:

detecting the hint in an event of a log of the cloud computing environment.

10. The method of claim 1, further comprising:

detecting the hint in a code object, the code object utilized to deploy a resource in the cloud computing environment.

11. A non-transitory computer-readable medium storing a set of instructions for a service account in a cloud computing environment for applying a cybersecurity control, the set of instructions comprising:

one or more instructions that, when executed by one or more processing circuitries of a device, cause the device to:

detect a terminal service principal in the cloud computing environment;

detect a hint which connects the terminal service principal to a root service principal;

store a representation of the terminal service principal, and the root service principal in a security database, wherein the security database includes a representation of the cloud computing environment; and apply a control on the representation of the terminal service principal based at least on the root service principal.

12. A system for a service account in a cloud computing environment for applying a cybersecurity control comprising:

a processing circuitry;

a memory, the memory containing instructions that, when executed by the processing circuitry, configure the system to:

detect a terminal service principal in the cloud computing environment;

detect a hint which connects the terminal service principal to a root service principal;

store a representation of the terminal service principal, and the root service principal in a security database, wherein the security database includes a representation of the cloud computing environment; and apply a control on the representation of the terminal service principal based at least on the root service principal.

13. The system of claim 12, wherein the memory contains further instructions that, when executed by the processing circuitry for detecting the hint, further configure the system to:

detect an event indicating that the root service principal assumed a first role.

14. The system of claim 13, wherein the memory contains further instructions that, when executed by the processing circuitry for assuming the first role, further configure the system to:

generate a second service account, the second service account associated with permissions of the first role; and detect an event associated with the second service account, wherein the service account is configured to initiate at least an action in the cloud computing environment utilizing the second service account.

15. The system of claim 14, wherein the second service account is the terminal service principal.

16. The system of claim 12, wherein the memory contains further instructions which when executed by the processing circuitry further configure the system to:

deploy a runtime sensor on a workload deployed in the cloud computing environment; and receive from the runtime sensor a runtime event.

17. The system of claim 16, wherein the memory contains further instructions which when executed by the processing circuitry further configure the system to:

detect the hint in the runtime event.

18. The system of claim 12, wherein the terminal service principal is an identity utilized only by a workload.

19. The system of claim 12, wherein the memory contains further instructions which when executed by the processing circuitry further configure the system to:

detect the hint in an event of a log of the cloud computing environment.

20. The system of claim 12, wherein the memory contains further instructions which when executed by the processing circuitry further configure the system to:

detect the hint in a code object, the code object utilized to deploy a resource in the cloud computing environment.

* * * * *